US010515432B2

(12) United States Patent
Seo et al.

(10) Patent No.: US 10,515,432 B2
(45) Date of Patent: Dec. 24, 2019

(54) METHODS AND APPARATUSES FOR MANAGING GRAPHICS DATA USING TWO-STAGE LOOKUP TABLES IN CACHE

(71) Applicant: Samsung Electronics Co., Ltd., Suwon-si, Gyeonggi-do (KR)

(72) Inventors: Woong Seo, Hwaseong-si (KR); Santosh George Abraham, Pleasanton, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 20 days.

(21) Appl. No.: 15/618,685

(22) Filed: Jun. 9, 2017

(65) Prior Publication Data
US 2018/0122041 A1    May 3, 2018

(30) Foreign Application Priority Data
Oct. 28, 2016   (KR) .......................... 10-2016-0142153

(51) Int. Cl.
*G06T 1/60*   (2006.01)
*G06T 1/20*   (2006.01)
G06T 15/00   (2011.01)

(52) U.S. Cl.
CPC ................. *G06T 1/60* (2013.01); *G06T 1/20* (2013.01); *G06T 15/005* (2013.01)

(58) Field of Classification Search
CPC ............ G06T 1/20; G06T 1/60; G06T 15/005
(Continued)

(56) References Cited

U.S. PATENT DOCUMENTS 5,914,726 A * 6/1999 Schultz ..................... G06T 1/60
345/501
6,690,380 B1 * 2/2004 Hussain .............. G06F 12/0875
345/557

(Continued)

FOREIGN PATENT DOCUMENTS

JP         3727244 B2    12/2005
JP         4550511 B2     9/2010
KR      20150117522 A   10/2015

OTHER PUBLICATIONS

Bagley, Steven et al., "Extracting Reusable Document Components for Variable Data Printing," Document Engineering Laboratory School of Computer Science, University of Nottingham, United Kingdom, pp. 1-9.

*Primary Examiner* — King Y Poon
*Assistant Examiner* — Vincent Peren
(74) *Attorney, Agent, or Firm* — Harness, Dickey & Pierce, P.L.C.

(57) ABSTRACT

A method of managing graphics data in a graphics processing device may include: receiving a first draw call having a first identifier, generating a first lookup table having the first identifier mapped in association with a first handle value by allocating the first handle value to the first identifier, generating a second lookup table having the first handle value mapped in association with a first graphics state setting value by allocating the first handle value to the first graphics state setting value, wherein the first graphics state setting value corresponds to the first identifier, and performing at least one graphics pipeline operation to process the first draw call by using the first graphics state setting value obtained from the second lookup table.

12 Claims, 10 Drawing Sheets

(58) Field of Classification Search
USPC ........ 345/501, 502, 503, 504, 505, 506, 522
See application file for complete search history.

(56) References Cited

U.S. PATENT DOCUMENTS

| | | |
|---|---|---|
| 6,859,860 B2 | 2/2005 | Saito et al. |
| 7,685,367 B2 | 3/2010 | Ruia et al. |
| 7,689,770 B2 | 3/2010 | Shimizuno et al. |
| 8,468,539 B2 | 6/2013 | Eichenberger et al. |
| 9,323,679 B2 | 4/2016 | Khailany et al. |
| 2006/0007233 A1* | 1/2006 | Hux ................ G06T 15/005 345/501 |
| 2008/0100627 A1* | 5/2008 | Nystad ............ G06T 15/005 345/502 |
| 2010/0030973 A1 | 2/2010 | Speight et al. |
| 2013/0031332 A1 | 1/2013 | Bryant et al. |
| 2015/0294436 A1 | 10/2015 | Jin et al. |
| 2018/0089266 A1* | 3/2018 | Vujic .................. G06F 16/22 |

* cited by examiner

FULLY SET ASSOCIATIVE CACHE

2-WAY SET ASSOCIATIVE CACHE

METHODS AND APPARATUSES FOR MANAGING GRAPHICS DATA USING TWO-STAGE LOOKUP TABLES IN CACHE

CROSS-REFERENCE TO RELATED APPLICATION

This application claims the benefit of Korean Patent Application No. 10-2016-0142153, filed on Oct. 28, 2016, in the Korean Intellectual Property Office, the disclosure of which is incorporated herein in its entirety by reference.

BACKGROUND

1. Field

The present disclosure relates to methods and/or apparatuses for managing graphics data.

2. Description of the Related Art

A graphics processing device such as a graphics processing unit (GPU) performs rendering graphics data in a computing apparatus. In general, the graphics processing device transforms graphics data corresponding to a two-dimensional (2D) or three-dimensional (3D) object into a 2D pixel format and generates a frame for displaying.

In general, a processing device, such as a central processing unit (CPU) and the GPU, fetches and processes commands or data stored in a large-capacity external memory. Most large-capacity external memories have much slower processing speeds than the processing device, and thus, use a cache system for improving the processing speed thereof.

The cache system stores data that the processing device has recently accessed, and when the processing device requests the same data again, improves data transmission speed by allowing the processing device to access a high-speed cache without accessing the external memory.

When data requested by the CPU is stored in a data memory of the cache system used by the GPU (that is, a cache hit), data in the data memory is transferred to the CPU. However, when data requested by the graphics processing device is not stored in the data memory (that is, a cache miss), data is fetched from the external memory. In addition, the cache system may delete some of the cache data stored in the data memory, update the memory data with the fetched data, and transfer the fetched data to the processing device.

SUMMARY

Provided are methods and apparatuses for managing graphics data. Aspects of the present disclosure should not be limited by the above description, and other unmentioned aspects will be clearly understood by one of ordinary skill in the art from example embodiments described herein.

Additional aspects will be set forth in part in the description which follows and, in part, will be apparent from the description, or may be learned by practice of the example embodiments.

According to example embodiments, methods of managing graphics data in a graphics processing device are provided, the methods may include receiving a draw call having a first identifier. The methods may further include generating a first lookup table having the first identifier mapped in association with a first handle value by allocating the first handle value to the first identifier. The methods may further include generating a second lookup table having the first handle value mapped in association with a first graphics state setting value mapped by allocating the first handle value to the first graphics state setting value, wherein the first graphics state setting value corresponds to the first identifier. Furthermore, the methods may include performing graphics pipeline operations to process the first draw call by using the first graphics state setting value obtained from the second lookup table.

In addition, when the handle value mapped to a previous identifier is allocated to the identifier, the first lookup table may be generated by mapping the handle value mapped to the previous identifier to the identifier as the first handle value.

In addition, the first handle value allocated to the first graphics state setting value may be differentiated from at least one other handle value included in the second lookup table.

In addition, the methods may further include receiving a next draw call; determining whether an identifier of the next draw call is included in the first lookup table; determining whether a second handle value mapped to the identifier of the next draw call is included in the second lookup table; and performing graphics pipeline operations to process the next draw call by using a second graphics state setting value mapped to the second handle value from the second lookup table, based on a result of determining whether the second handle value is included in the second lookup table.

In addition, when it is determined that the identifier of the next draw call is included in the first lookup table, the methods may further include obtaining the first handle value mapped to the identifier of the next draw call from the first lookup table, wherein the second handle value is the same as the first handle value.

In addition, when it is determined that the identifier of the next draw call is not included in the first lookup table, the methods may further include allocating the second handle value to the identifier of the next draw call; updating the first lookup table by mapping the identifier of the next draw call and the second handle value; and obtaining the second handle value mapped to the identifier of the next draw call from the first lookup table.

In addition, when it is determined that the second handle value is included in the second lookup table, the methods may further include obtaining the second graphics state setting value mapped to the second handle value from the second lookup table.

In addition, when it is determined that the second handle value is not included in the second lookup table, the methods may further include allocating the second handle value to the second graphics state setting value corresponding to the identifier of the next draw call; updating the second lookup table by mapping the second handle value and the second graphics state setting value; and obtaining the second graphics state setting value mapped to the second handle value from the second lookup table.

In addition, the methods may determine whether the identifier of the next draw call is included in the first lookup table is determined by using fully set associative methods, and determine whether the second handle value is included in the second lookup table by using n-way set associative methods.

According to example embodiments, graphics processing apparatuses managing graphics data are provided, the graphics processing apparatuses may include: a cache configured to store a first lookup table and a second lookup table, and at least one processor configured to receive a first draw call having a first identifier. The at least one processor may be further configured to generate a first lookup table having the first identifier mapped in association with a first handle value by allocating the first handle value to the first identifier. The at least one processor may be further configured to generate a second lookup table having the first handle value mapped in association with a first graphics state setting value by allocating the first handle value to the first graphics state setting value, wherein the first graphics state setting value corresponds to the first identifier. Furthermore, the at least one processor may be further configured to perform graphics pipeline operations to process the first draw call by obtaining the first graphics state setting value from the second lookup table.

In addition, when the handle value mapped to a previous identifier is allocated to the identifier, the at least one processor may be further configured to generate the first lookup table by mapping the handle value mapped to the previous identifier to the identifier as the first handle value.

In addition, the at least one processor may be further configured to differentiate the first handle value allocated to the first graphics state setting value from at least one other handle value included in the second lookup table.

In addition, the at least one processor may be further configured to receive a next draw call, determine whether the identifier of the next draw call is included in the first lookup table, determine whether a second handle value mapped to the identifier of the next draw call is included in the second lookup table, and perform the graphics pipeline operations to process the next draw call by using a second graphics state setting value mapped to the second handle value from the second lookup table, based on a result of determining whether the second handle value is included in the second lookup table.

In addition, when it is determined that the identifier of the next draw call is included in the first lookup table, the at least one processor may be further configured to obtain the first handle value mapped to the identifier of the next draw call from the first lookup table, and the second handle value may be the same as the first handle value.

In addition, when it is determined that the identifier of the next draw call is not included in the first lookup table, the at least one processor may be further configured to allocate the second handle value to the identifier of the next draw call, update the first lookup table by mapping the identifier of the next draw call and the second handle value, and obtain the second handle value mapped to the identifier of the next draw call from the first lookup table.

In addition, when it is determined the second handle value is included in the second lookup table, the at least one processor may be further configured to obtain the second graphics state setting value mapped to the second handle value from the second lookup table.

In addition, when it is determined that the second handle value is not included in the second lookup table, the at least one processor may be further configured to allocate the second handle value to the second graphics state setting value corresponding to the identifier of the next draw call, update the second lookup table by mapping the second handle value and the second graphics state setting value, and obtain the second graphics state setting value mapped to the second handle value from the second lookup table.

In addition, the at least one processor may be further configured to determine whether the identifier of the next draw call is included in the first lookup table by using the fully set associative methods, and determine whether the second handle value is included in the second lookup table by using the n-way set associative methods.

According to example embodiments, methods are provided, the methods may include receiving a draw call including a draw call identifier. The methods may further include determining whether a first lookup table in a cache includes the draw call identifier. The methods may further include identifying a handle value stored in association with the draw call identifier, in response to determining that the first lookup table includes the draw call identifier. The methods may further include determining whether a second lookup table in the cache includes the handle value. The methods may further include identifying a graphics state setting value stored in association with the handle value, in response to determining that the second lookup table includes the handle value. Furthermore, the methods may include performing graphics pipeline operations to process the draw call using the identified graphics state setting value.

According to example embodiments, a non-transitory computer readable recording medium having recorded thereon a program for executing the above methods on a computer may be provided.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
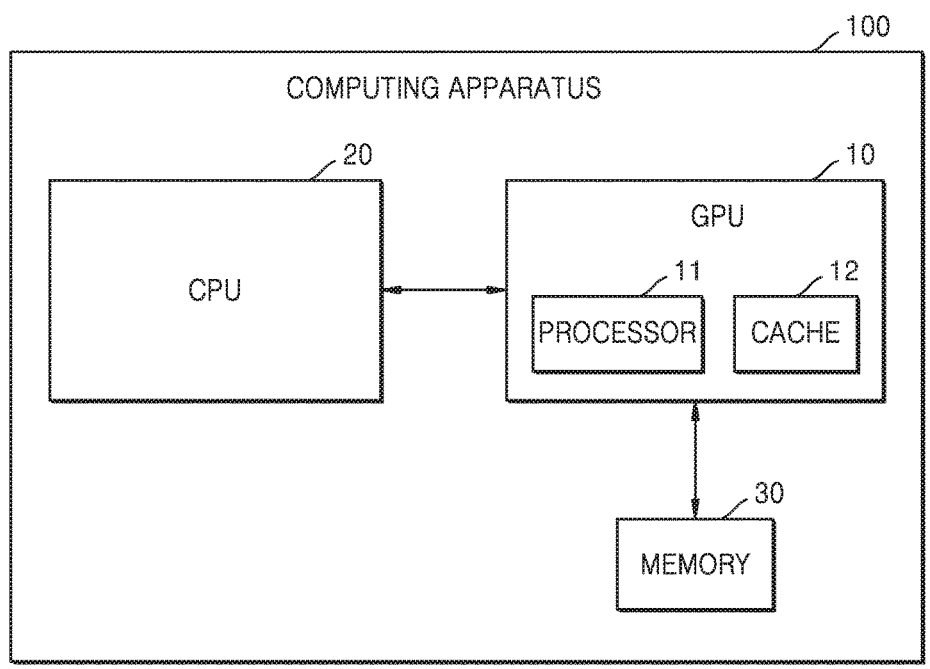
FIG. 1 is a block diagram of a computing apparatus according to example embodiments.

Reference will now be made in detail to example embodiments, illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects.

While example embodiments have been particularly shown and described, it will be understood by those of ordinary skill in the art that various changes in form and details may be made therein without departing from the spirit and scope defined by the appended claims. The example embodiments should be considered in a descriptive sense only and not for purposes of limitation. Therefore, the scope of the example embodiments is defined not by the detailed description of the example embodiments but by the appended claims, and all differences within the scope will be construed as being included in the example embodiments.

When a portion includes a composing element, the case may denote further including other composing elements without excluding other composing elements unless otherwise described. The terms " . . . unit" or "module" may denote a unit performing one of specific function or movement and may be realized by hardware, software or a combination of hardware and software.

Throughout the specification, the term "consists of" or "includes" should not be interpreted as meaning that all of various elements, operations or steps described in the specification are absolutely included, and should be interpreted as meaning that some of elements, operations or steps may not be included or that additional elements, operations or steps may be further included.

While such terms as "first," "second," etc., may be used to describe various components, such components must not be limited to the above terms. The above terms are used only to distinguish one component from another.

The example embodiments will now be described more fully with reference to the accompanying drawings, in which example embodiments are shown. The example embodiments may, however, be provided in many different forms and should not be construed as being limited to the example embodiments set forth herein.

Hereinafter, the example embodiments will be described in detail by explaining example embodiments with reference to the attached drawings.

FIG. 1 is a block diagram of a computing apparatus 100 according to example embodiments.

Referring to FIG. 1, the computing apparatus 100 may include a graphics processing unit (GPU) 10, a central processing unit (CPU) 20, and a memory 30. It will be readily understood by one of ordinary skill in the art that other general-purpose components may be further included in computing apparatus 100, in addition to components illustrated in FIG. 1.

The computing apparatus 100 may include a desktop computer, a notebook computer, a smart phone, a personal digital assistant (PDA), a portable media player, a video game console, a TV set-top box, a tablet device, an e-book reader, a wearable device, etc. However, example embodiments are not limited thereto. In other words, the computing apparatus 100 may be any apparatus capable of processing graphics for displaying content and may include various apparatuses.

The GPU 10 may be an exclusive graphics processor performing graphics pipeline operations of various versions and types such as open graphics library (OpenGL), DirectX, and compute unified device architecture (CUDA). The GPU 10 may be implemented with hardware realized to perform three-dimensional (3D) graphics pipeline operations for converting 3D objects in 3D images to two-dimensional (2D) images for rendering and displaying. In example embodiments, the GPU 10 may perform various functions such as shading, blending, illuminating, and generating pixel values of pixels to be displayed.

The GPU 10 may receive a command from the CPU 20. A draw command may be a command ordering what object is to be rendered to an image or a frame. In example embodiments, the draw command may be a command for drawing a certain number of quadrangles or triangles included in the image or the frame. The draw command may be a draw call according to example embodiments.

The GPU 10 may include at least one processor 11 and at least one cache 12. The processor 11 may store in the cache 12 graphics data included in a received draw call and graphics data received from the memory 30. In addition, the processor 11 may perform each operation of the graphics pipeline by using the graphics data stored in the cache 12, based on the graphics data indicated in the received draw call.

The graphics data may be data used for rendering. The graphics data may include an identifier of the draw call and a graphics state setting value according to example embodiments. However, example embodiments are not limited thereto. According to example embodiments, one graphics state setting value may correspond to one identifier of the draw call and different graphics state setting values may correspond to different identifiers of draw calls.

The graphics state setting value may denote various setting values that refer to each operation of the graphics pipeline. In example embodiments, the graphics state setting value may include a setting value for selecting one method between a bilinear filtering method, involving selecting pixels by performing weighted-averaging of four adjacent pixels, and a nearest filtering method involving selecting a closest pixel among four adjacent pixels. In example embodiments, the graphics state setting value may include a setting value for denoting whether data format has 32 bits or 8 bits.

The CPU 20 may be implemented in hardware and control overall operations and functions of the computing apparatus 100. In example embodiments, the CPU 20 may drive an operating system (OS), call an application programming interface (API) for the GPU 10, and execute a driver of the GPU 10. In addition, the CPU 20 may execute various applications stored in the memory 30 such as a web browsing application, a game application, and a video application.

The memory 30 may be implemented in hardware that stores various data processed in the computing apparatus 100, and stores data processed and to be processed by the GPU 10. In addition, the memory 30 may store applications, drivers, etc. that are to be driven by the GPU 10 and the CPU 20. The memory 30 may include random access memory (RAM) such as dynamic random access memory (DRAM) and static random access memory (SRAM), read-only memory (ROM), electrically erasable programmable read-only memory (EEPROM), CD-ROM, Blu-ray or other optical disc storage, hard disk drive (HDD), solid state drive (SSD), and flash memory, and may further include other external storage devices which the computing apparatus 100 may access.

The computing apparatus 100 may further include a display (not shown). The display may display rendered images received from the CPU 20 or the GPU 10.

Figure 2:
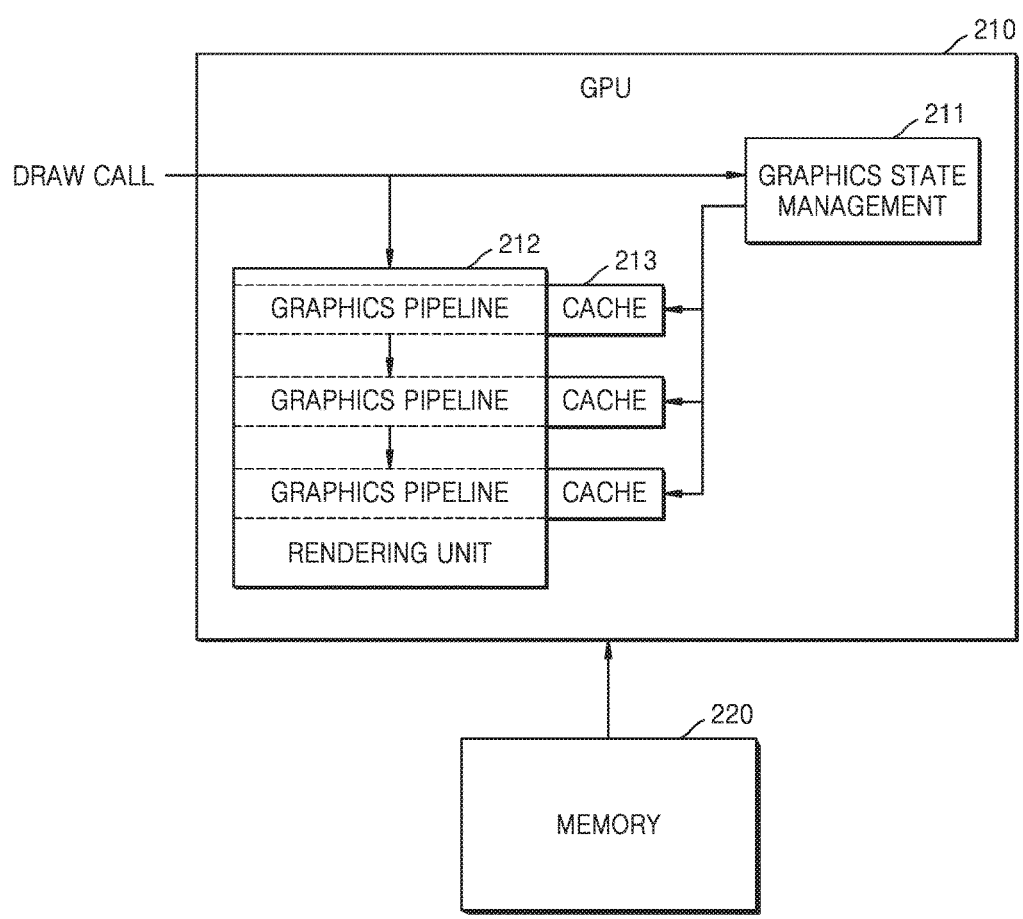
FIG. 2 is a diagram illustrating a GPU performing a rendering process according to example embodiments.

FIG. 2 is a diagram illustrating a GPU performing a rendering process according to example embodiments.

Referring to FIG. 2, a GPU 210 may include a graphics state management (hereinafter, GSM) 211, a rendering unit 212, and a cache 213. The GSM 211 and the rendering unit 212 may be realized by at least one processor included in the GPU 210 or by a hardware combined with the GPU 210. In example embodiments, the GSM 211 and the rendering unit 212 may be implemented as programming modules stored in a memory and executed using a processor to implement the functions described herein. In addition, the rendering process may use a memory 220 having an identifier of a draw call and a graphics state setting value mapped and stored therein.

The rendering unit 212 may perform each operation of the graphics pipeline. The GSM 211 may request the memory 220 for the graphics state setting value corresponding to the identifier of a received draw call and receive the requested graphics state setting value from the memory 220. In addition, the GSM 211 may store the received graphics state setting value in the cache 213 such that the received graphics state setting value may be referenced at each operation of the graphics pipeline.

When the GPU 210 receives a draw call, the rendering unit 212 may perform each operation of the graphics pipeline based on instructions provided by the draw call. In example embodiments, the rendering unit 212 may perform graphics pipeline operations such as vertex shading, rasterization, and pixel shading. When the rendering unit 212 performs the operations of the pipeline, the rendering unit 212 may access the cache 213 before accessing the memory 220. When a graphics state setting value corresponding to an identifier of the received draw call is stored in the cache 213, an operation in accordance with a cache hit may be performed. In the case of the cache hit, the rendering unit 212 may perform each operation of the graphics pipeline by using the graphics state setting value obtained from the cache 213.

Data stored in the memory 220 is selected for storage in the cache 213 based on the relatively high likelihood of that data being subsequently requested. In example embodiments, the likelihood of data being subsequently requested is determined based on how frequently the data is used. As discussed further above, the cache 213 provides a faster access time as compared to the access time of memory 220. Accordingly, a data transfer speed may be enhanced by accessing the cache 213 before accessing the memory 220.

When the graphics state setting value corresponding to the identifier of the received draw call is not stored in the cache 213, an operation for a cache miss may be performed. In the case of the cache miss, the GSM 211 may receive the graphics state setting value corresponding to the identifier of the draw call from the memory 220. The cache 213 may store the received graphics state setting value and the rendering unit 212 may perform each operation of the graphics pipeline by using the graphics state setting value obtained from the cache 213.

Figure 3:
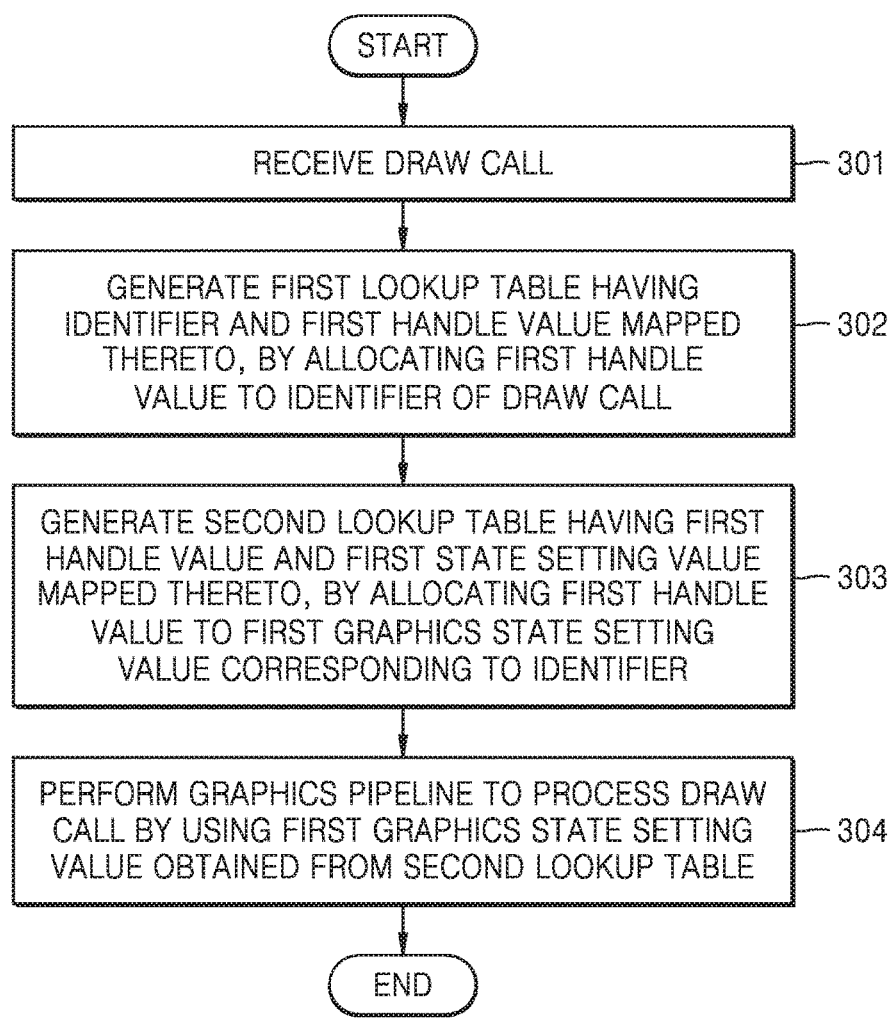
FIG. 3 is a flowchart illustrating methods of processing a draw call by generating a plurality of lookup tables according to example embodiments.

FIG. 3 is a flowchart illustrating methods of processing a draw call by generating a plurality of lookup tables according to example embodiments.

Referring to FIG. 3, a GPU (e.g., GPU 10) may receive a draw call in operation 301. The GPU may receive the draw call from a CPU (e.g., CPU 20). The received draw call may include an identifier of the draw call and data to be processed at each operation of the graphics pipeline. However, example embodiments are not limited thereto. In example embodiments, the draw call may include data to be processed for performing the vertex shading, the rasterization, and the pixel shading at each operation of the graphics pipeline. However, the GPU may use not only data included in the draw call but also the graphics state setting value for performing each operation of the graphics pipeline and may receive the graphics state setting value from a cache (e.g., cache 12) or a memory (e.g., memory 30).

In operation 302, the GPU may generate a first lookup table having the identifier and a first handle value mapped thereto by allocating the first handle value to the identifier of the draw call. The first lookup table may be stored in the cache.

The handle value may be a value denoting a particular memory area allocated in the memory. In example embodiments, the particular memory area may be allocated in the memory for each of the graphics state setting values and the handle value may be the value differentiating the particular memory area allocated in the memory. When the handle value is known, the GPU may access a location of the particular memory area in the memory and thus, receive the graphics state setting value by using the handle value. The handle value may be a memory address. However, example embodiments are not limited thereto.

In operation 303, the GPU may generate a second lookup table having the first handle value and the first graphics state setting value mapped thereto by allocating the first handle value to the first graphics state setting value corresponding to the identifier of the draw call.

The first and second lookup tables may be decoupled from each other. The first lookup table may map and store the identifier of the draw call and the first handle value, and the second lookup table may map and store the first handle value and the graphics state setting value. Thus, both the first and second lookup tables may include the first handle value. However, while a same handle value may be stored in duplicate in the first lookup table, different handle values from each other may not be stored in duplicate in the second lookup table. Thus, the identifier of the draw call included in the first lookup table and the graphics state setting value included in the second lookup table may not be mapped one-to-one. Accordingly, the first and second lookup tables may be decoupled from each other.

In operation 304, the GPU may complete the graphics pipeline to process the draw call by obtaining the first graphics state setting value from the second lookup table.

Figure 4:
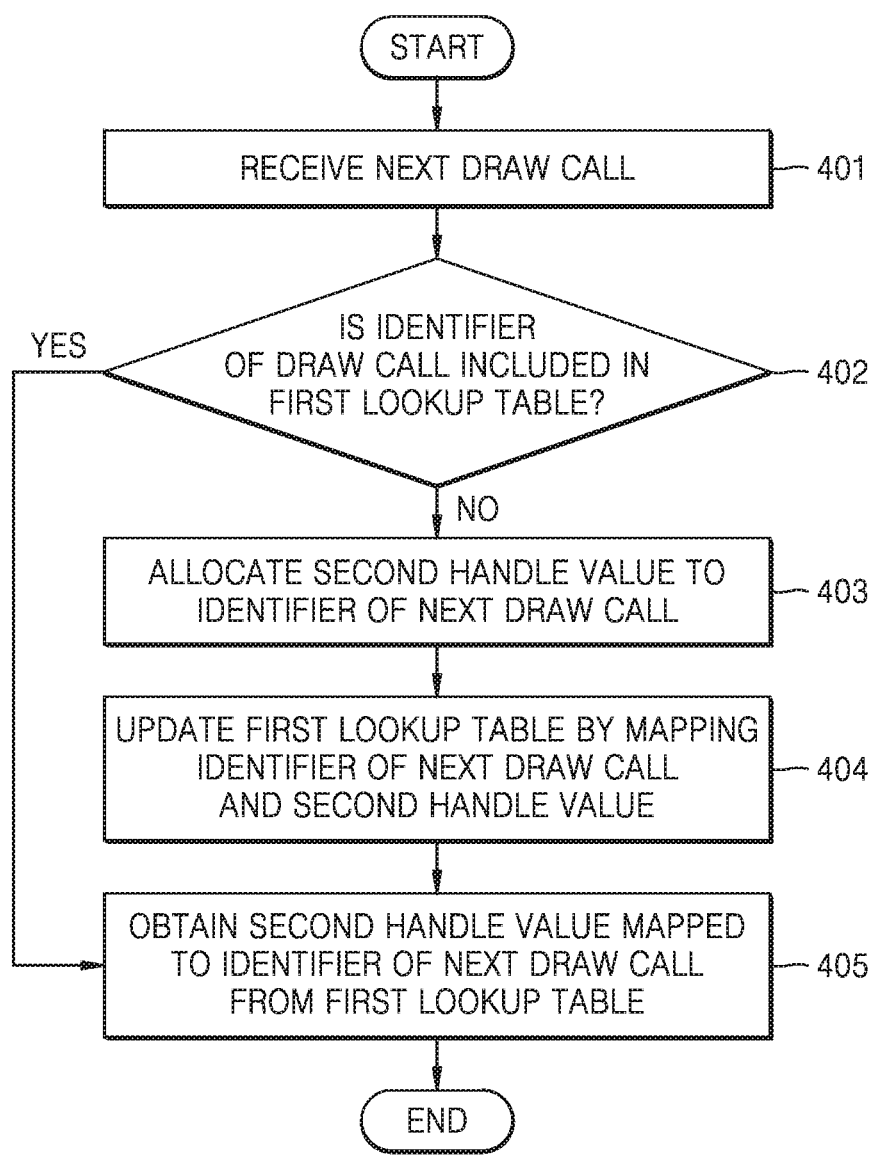
FIG. 4 is a flowchart illustrating methods of managing graphics data in a first lookup table according to example embodiments.

FIG. 4 is a flowchart illustrating methods of managing the graphics data in a first lookup table according to example embodiments.

Referring to FIG. 4, in operation 401, a GPU (e.g., GPU 10) may receive a next draw call from a CPU (e.g., CPU 20).

In operation 402, the GPU may determine whether an identifier of the next draw call is included in a first lookup table. Identifiers of draw calls and handle values which have been previously received may have been mapped and included in the first lookup table.

The GPU may determine whether the identifier of the next draw call is included in the first lookup table by using fully set associative methods. In the fully set associative methods, the identifier of the next draw call may be stored at any entry in the first lookup table. In example embodiments, when N identifiers of draw calls are included in the first lookup table, the identifier of the next draw call may be stored at any entry among the N entries in the first lookup table. Accordingly, the GPU may search all of N entries in the first lookup table and determine whether the identifier of the next draw call is included in the first lookup table.

When it is determined that the identifier of the next draw call is not included in the first lookup table as a result of operation 402, the GPU may proceed to operation 403. In example embodiments, the first lookup table contains a plurality of entries. Each entry includes a draw call identifier in association with a particular handle value. Thus, a determination that the identifier of the next draw call is not included in the first lookup table is also a determination that a second handle value corresponding to the identifier of the next draw call is not included in the first lookup table.

In operation 403, the GPU may allocate a second handle value to the identifier of the next draw call.

The GPU may receive the second handle value from a memory (e.g., memory 30). The second handle value may denote a particular memory area in the memory, in which the graphics state setting value corresponding to the identifier of the next draw call is stored. In addition, the GPU may allocate the second handle value received from the memory to the identifier of the next draw call.

In operation 404, the GPU may update the first lookup table by mapping the identifier of the next draw call and the second handle value.

In the first lookup table, the second handle value may be different from the first handle value which has been mapped to the identifier of a previous draw call.

However, the identifier of the previous draw call and the identifier of the next draw call, which are different from each other, may correspond to a same graphics state setting value. In this case, the second handle value may be the same as the first handle value mapped to the identifier of the previous draw call. In other words, as a result of operation 404, the same handle value that has been mapped to the identifier of the previous draw call and the identifier of the next draw call, which are different from each other, may be included in duplicate in the first lookup table.

In operation 405, the GPU may obtain the second handle value mapped to the identifier of the next draw call from the first lookup table.

When it is determined that the identifier of the next draw call is included in the first lookup table as a result of determination in operation 402, the GPU may proceed to operation 405. As discussed further in association with operation 402, a determination that the identifier of the next draw call is included in the first lookup table is also a determination that the second handle value corresponding to the identifier of the next draw call is included in the first lookup table.

Figure 5:
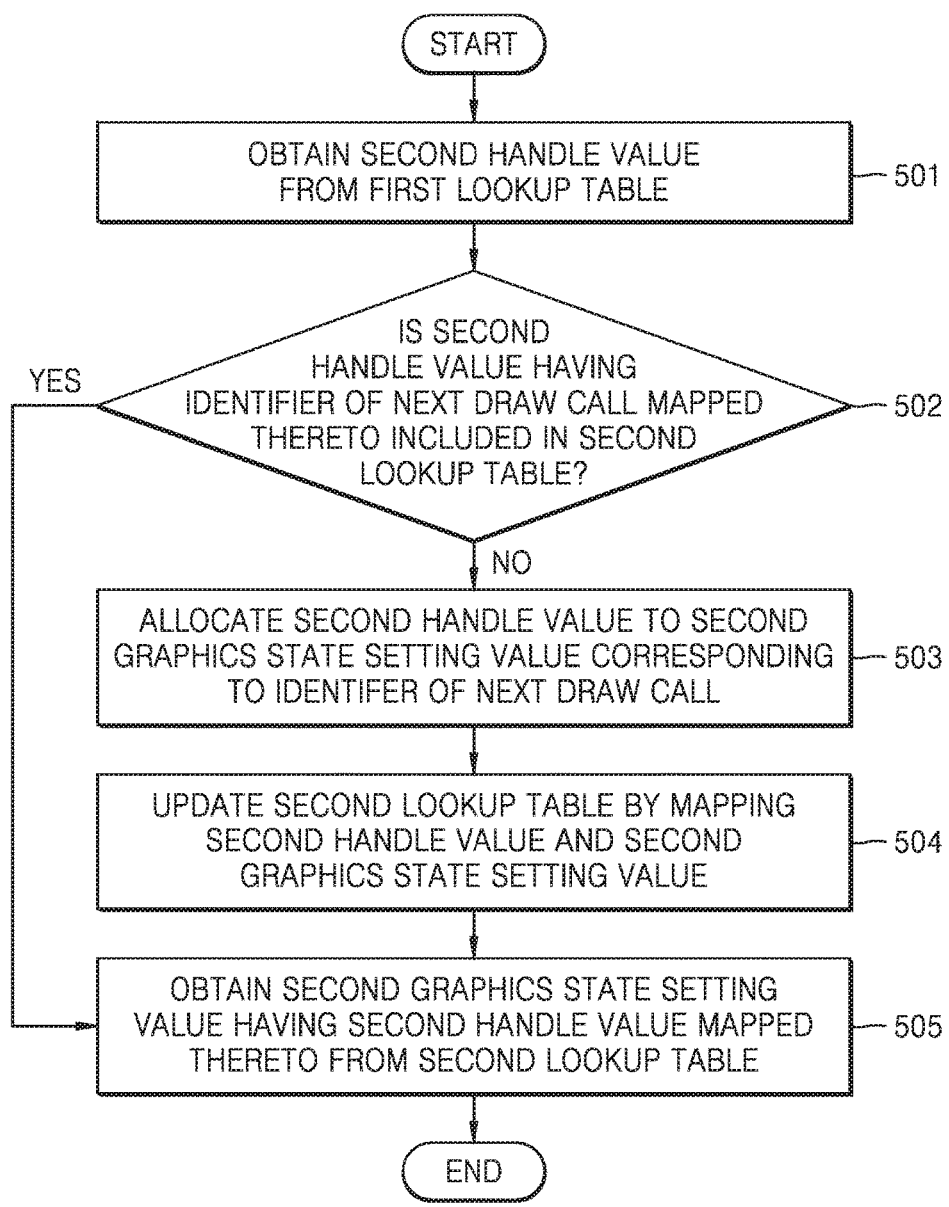
FIG. 5 is a flowchart illustrating methods of managing graphics data in a second lookup table according to example embodiments.

FIG. 5 is a flowchart illustrating methods of managing graphics data in a second lookup table according to example embodiments.

Referring to FIG. 5, in operation 501, a GPU (e.g., GPU 10) may obtain a second handle value from a first lookup table (e.g., the first lookup table described in association with FIG. 4).

In operation 502, the GPU may determine whether the second handle value mapped to an identifier of a next draw call is included in a second lookup table. Handle values and graphics state setting values which have been previously obtained may be included in the second lookup table.

The GPU may determine whether the second handle value mapped to the identifier of the next draw call is included in the second lookup table by using n-way set associative methods. In the n-way set associative methods, the second handle value may be stored in only an n-way, that is, in only n entries in the second lookup table. In example embodiments, when M (M>n) handle values are included in the second lookup table, the second handle values may be stored in determined n entries among M entries in the second lookup table. Accordingly, the GPU may determine whether the second handle value is included in the second lookup table by searching for the determined n entries among M entries in the second lookup table.

When it is determined that the second handle value is not included in the second lookup table as a result of determination in operation 502, the GPU may proceed to operation 503.

In operation 503, the GPU may allocate the second handle value to a second graphics state setting value corresponding to the identifier of the next draw call.

The GPU may receive the second handle value from a memory (e.g., memory 30). In example embodiments, the memory includes a plurality of entries. Each entry includes a memory address, and a draw call identifier and a graphics state setting value stored in association with each other at the memory address. In order to allocate the second handle value, the GPU access the memory and looks up the next draw call identifier. The GPU then allocates the memory address associated with the next draw call identifier as the second handle value. In addition, the GPU may allocate the second handle value received from the memory to the second graphics state setting value stored at the memory address in association with the identifier of the next draw call.

In operation 504, the GPU may update the second lookup table by mapping the second handle value and the second graphics state setting value. The second handle value may be different from at least one other handle value included in the second lookup table.

When handle values previously obtained are stored at all entries in the second lookup table, the GPU may delete any one of the handle values stored at the entries and update the second handle value received from the memory. In example embodiments, the GPU may delete the oldest handle value stored in the second lookup table entries and the graphics state setting value mapped thereto, and update the second lookup table by mapping the second handle value and the second graphics state setting value received from the memory.

In operation 505, the GPU may obtain the second graphics state setting value mapped to the second handle value from the second lookup table.

When it is determined that the second handle value is included in the second lookup table based on the determination of operation 502, the GPU may proceed to operation 505.

Figure 6:
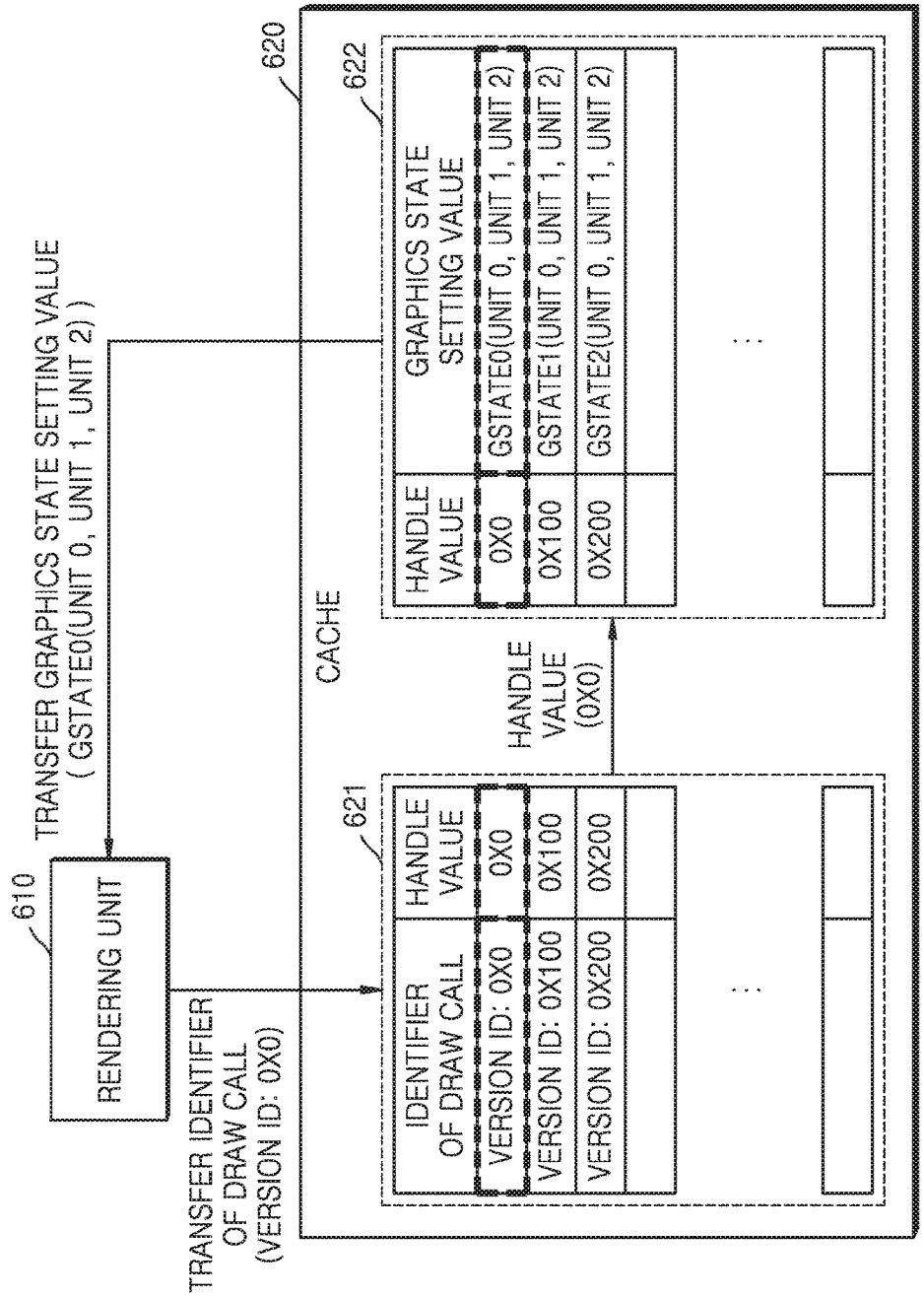
FIG. 6 is a diagram illustrating methods for locating a graphics state setting value in a cache for use by a rendering unit according to example embodiments.

FIG. 6 is a diagram illustrating methods for locating a graphics state setting value in a cache 620 for use by a rendering unit 610 according to example embodiments.

The rendering unit 610 may transfer an identifier of a draw call to the cache 620. In example embodiments, the rendering unit 610 may transfer to the cache 620 the identifier of the draw call or 'Version ID: 0X0' received from a CPU (e.g., CPU 20).

In addition, a GPU (e.g., GPU 10) may determine whether the identifier transferred by the rendering unit 610 is included in a first lookup table 621 stored in the cache 620. In example embodiments, the GPU may determine whether the identifier of the draw call or the 'Version ID: 0X0' is included in the first lookup table 621 by using the fully set associative methods.

When it is determined that the identifier of the draw call is included in the first lookup table 621, the GPU may obtain a handle value mapped to the identifier of the draw call from the first lookup table 621. In example embodiments, when the identifier of the received draw call or the 'Version ID: 0X0' is included in the first lookup table 621, the GPU may obtain a handle value or '0X0' mapped to the 'Version ID: 0X0' from the first lookup table 621.

In addition, the GPU may determine whether the obtained handle value is included in the second lookup table 622. For example, the GPU may determine whether the handle value or '0X0' is included in a second lookup table 622 by using the n-way set associative methods.

When it is determined that the obtained handle value is included in the second lookup table 622, the GPU may obtain from the second lookup table 622 the graphics state setting value mapped to the handle value. In example embodiments, when the obtained handle value or '0X0' is included in the second lookup table 622, the GPU may obtain from the second lookup table 622 a graphics state setting value or 'gstate0(unit 0, unit 1, unit 2)' having the handle value or '0X0' mapped thereto. The graphics state setting value or 'gstate0(unit 0, unit 1, unit 2)' may denote that when the GPU performs three graphics pipeline operations, the three units performing the respective graphics pipeline operations refer to values that are respectively represented by variables: unit 0, unit 1, and unit 2.

In addition, the obtained graphics state setting values may be transferred to the rendering unit 610. The rendering unit 610 may perform the operations of the graphics pipeline to process draw calls by using the transferred graphics state setting values.

Figure 7:
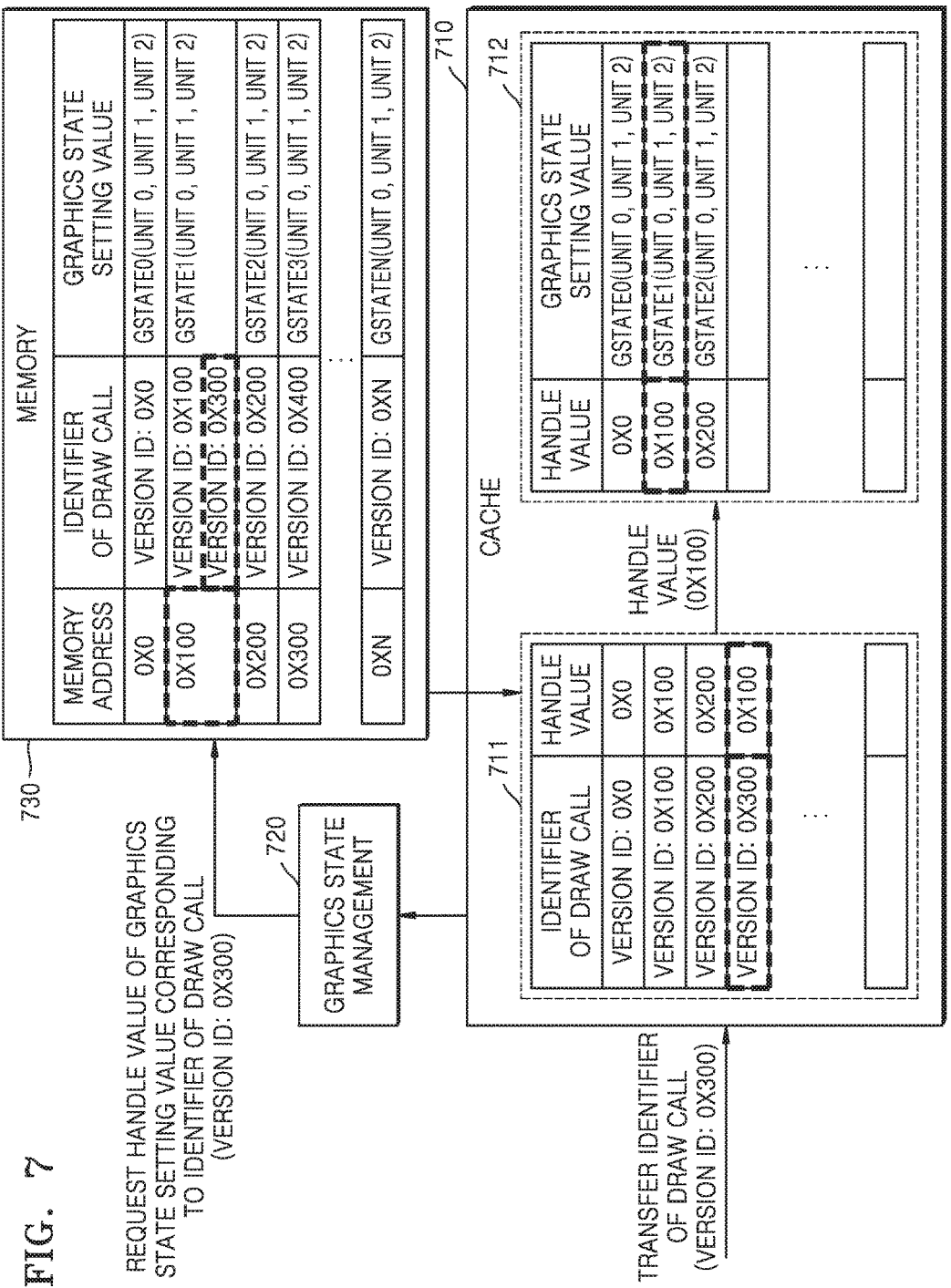
FIGS. 7 through 9 are diagrams illustrating methods of managing graphics data in caches by using a two-stage lookup methods according to example embodiments.
Figure 8:
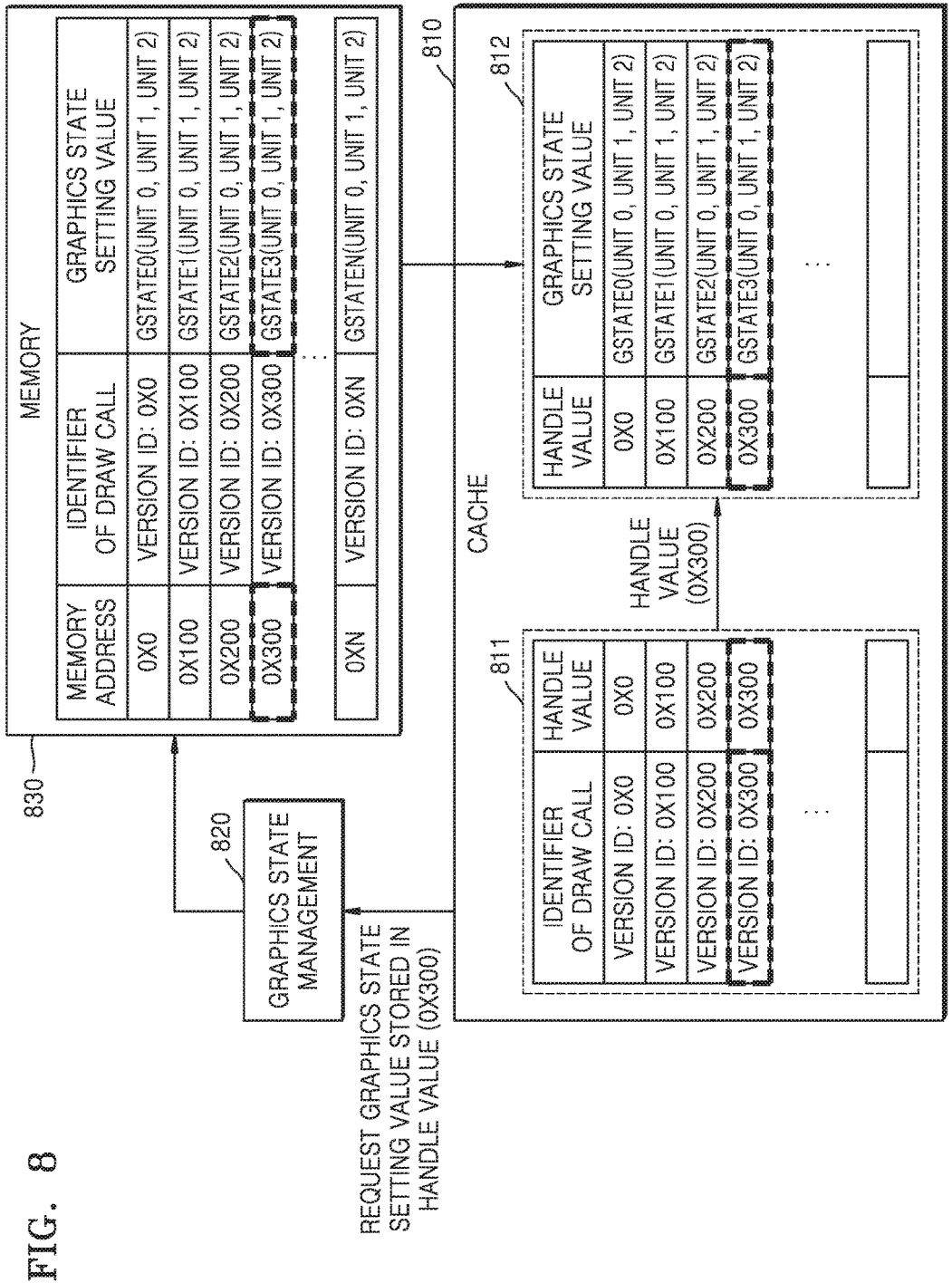
Figure 9:
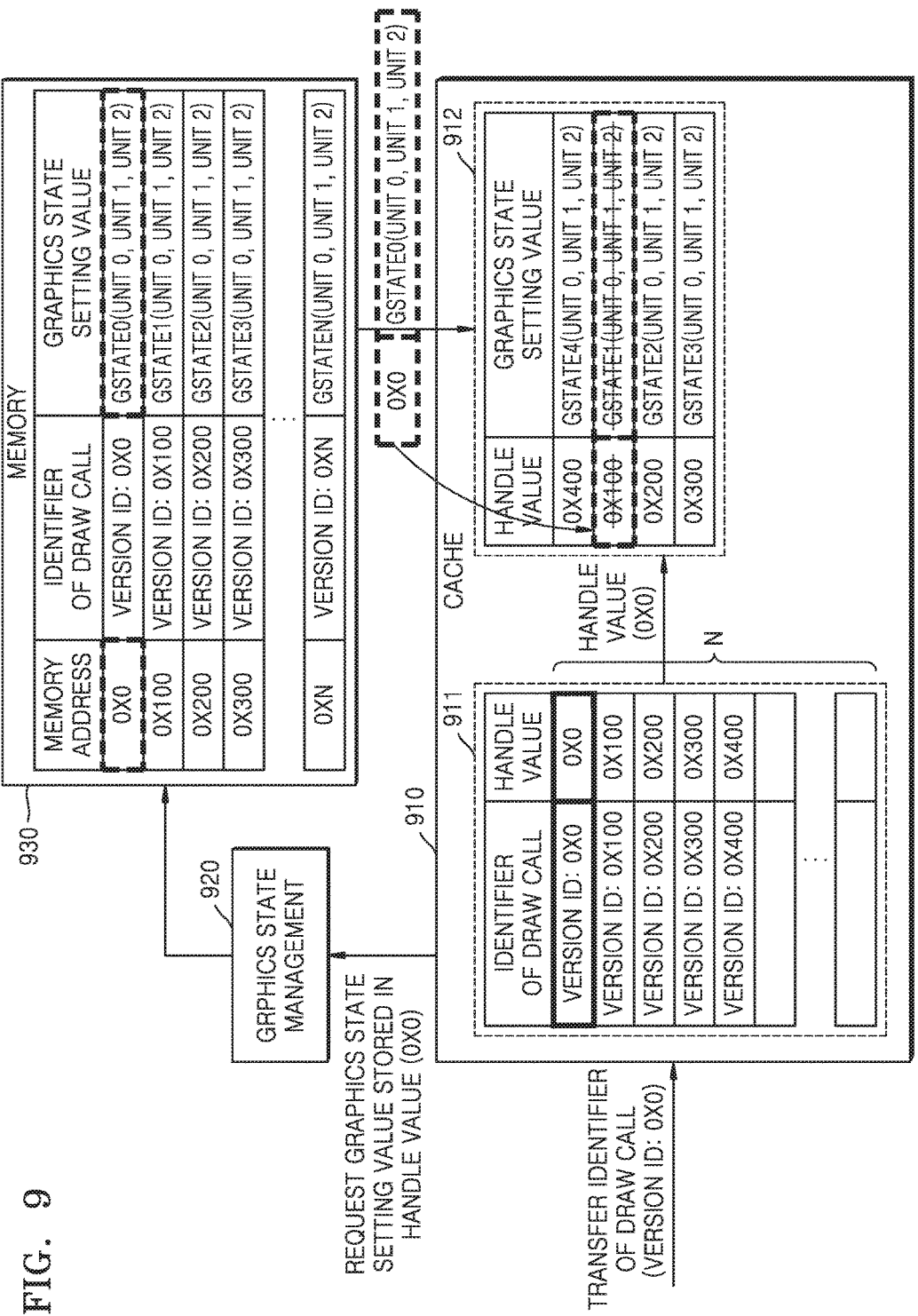

FIGS. 7 through 9 are diagrams illustrating methods of managing graphics data in caches 710, 810, and 910 by using two-stage lookup methods according to example embodiments.

Referring to FIG. 7, a GPU (e.g., GPU 10) may transfer an identifier of a draw call to a cache 710. In example embodiments, the GPU may transfer to the cache 710 the identifier of the draw call or 'Version ID: 0X300'.

In addition, the GPU may determine whether the identifier of the draw call is included in a first lookup table 711 stored in the cache 710. When it is determined that the identifier of the draw call is not included in the first lookup table 711, a GSM 720 may request from a memory 730 a handle value of a graphics state setting value corresponding to the identifier of the draw call. The handle value may be a memory address storing the graphics state setting value in the memory 730. Thus, the handle values included in the first lookup table 711, and a second lookup table 712, correspond to the memory addresses of the memory 730 as illustrated in FIG. 7. This correspondence between handle values and memory addresses will be used as a premise for the descriptions below. In example embodiments, the GSM 720 may request from the memory 730 the handle value of the graphics state setting value corresponding to the 'Version ID: 0X300'.

In addition, the GPU may receive from the memory 730 the handle value of the graphics state setting value corresponding to the identifier of the draw call. The cache 710 may allocate the handle value to the identifier of the draw call.

In addition, the GPU may update the first lookup table 711 by mapping the identifier of the draw call and the handle value. In example embodiments, the GPU may update the first lookup table 711 by mapping the identifier of the draw call or the 'Version ID: 0X300' and the handle value, that is, the memory address or '0X100'. As a result of updating, same handle values may be stored in duplicate in the first lookup table 711.

In addition, the GPU may obtain the updated handle value from the first lookup table 711. In example embodiments, the GPU may obtain the updated handle value or '0X100' from the first lookup table 711.

In addition, the GPU may obtain from the second lookup table 712 the graphics state setting value mapped to the obtained handle value. In example embodiments, the GPU may obtain from the second lookup table 712 the graphics state setting value or 'gstate1(unit 0, unit 1, unit 2) mapped to the obtained handle value.

In addition, the GPU may perform the graphics pipeline operations to process the draw call by using the obtained graphics state setting value or the 'gstate1(unit 0, unit 1, unit 2)'.

Referring to FIG. 8, a GPU (e.g., GPU 10) may obtain a handle value or '0X300' from a first lookup table 811.

In addition, the GPU may determine whether the handle value mapped to an identifier of a next draw call is included in a second lookup table 812. When it is determined that the handle value is not included in the second lookup table 812, a GSM 820 may request a memory 830 for the graphics state setting value by using the handle value. In example embodiments, the GSM 820 may request the memory 830 for the graphics state setting value stored in the handle value or '0X300'.

In addition, the GSM 820 may receive the graphics state setting value from the memory 830. A cache 810 may associate the handle value to the graphics state setting value.

In addition, the GPU may update the second lookup table 812 by mapping the handle value and the graphics state setting value. In example embodiments, the GPU may update the second lookup table 812 by mapping the handle value or '0X300' and the graphics state setting value or 'gstate3(unit 0, unit 1, unit 2)'. The updated handle value may be differentiated from at least one other handle value included in the second lookup table 812.

In addition, the GPU may obtain the graphics state setting value or 'gstate3(unit 0, unit 1, unit 2)' mapped to the handle value or '0X300' and perform the graphics pipeline operations to process the draw call by using the obtained graphics state setting value or 'gstate3(unit 0, unit 1, unit 2)'.

Referring to FIG. 9, a GPU (e.g., GPU 10) may transfer an identifier of a draw call to a cache 910. In example embodiments, the GPU may transfer to the cache 910 the identifier of the draw call or the 'Version ID: 0X0'.

In addition, when the identifier of the draw call received by the GPU or the 'Version ID: 0X0' is included in a first lookup table 911, the GPU may obtain from the first lookup table 911 the handle value or '0X0' mapped to the 'Version ID: 0X0'.

In FIG. 6, the identifier of the draw call or the 'Version ID: 0X0' may be included in the first lookup table 611 and the handle value or '0X0' mapped to the 'Version ID: 0X0' may also be included in the second lookup table 612. However, in FIG. 9, even though the identifier of the draw call or the 'Version ID: 0X0' is included in the first lookup table 911, the handle value or '0X0' mapped to the 'Version ID: 0X0' may not be included in a second lookup table 912.

The first lookup tables may store more entries than the second lookup tables. In example embodiments, the first lookup table 911 may store N (N>4) entries and a second lookup table 912 may store four entries. When the GPU sequentially receives five identifiers of draw calls having different handle values from each other, since handle values have been stored at all entries in the second lookup table 912, the GPU may update the second lookup table 912 with a handle value or '0X400' mapped to an identifier of the fifth received draw call or 'Version ID: 0X400' by deleting any one of the stored handle values and a graphics state setting value mapped thereto. In example embodiments, the GPU may delete from the entries the first stored handle value or '0X0' and the graphics state setting value of 'gstate0(unit 0, unit 1, unit 2)' mapped thereto.

When a newly obtained handle value from the first lookup table 911 or '0X0' is a deleted handle value in the second lookup table 912, the GPU may determine that the newly obtained handle value or '0X0' is not included in the second lookup table 912. The GPU may request a memory 930 for a graphics state setting value mapped to the newly obtained handle value or '0X0' and receive from the memory 930 the graphics state setting value. The GPU may update the second lookup table 912 by mapping the handle value or '0X0' and the graphics state setting value or 'gstate0(unit 0, unit 1, unit 2)'. Since handle values have been stored at all entries in the second lookup table 912, the GPU may update the second lookup table 912 after having deleted the oldest stored handle value among stored handle values or '0X100' and the graphics state setting value or 'gstate1(unit 0, unit 1, unit 2)' mapped thereto.

In addition, the GPU may obtain the graphics state setting value or 'gstate0(unit 0, unit 1, unit 2)' mapped to the handle value or '0X0' and perform the graphics pipeline operations to process the draw call by using the obtained graphics state setting value or 'gstate0(unit 0, unit 1, unit 2)'.

As illustrated in FIGS. 6 through 9, when the graphics data is managed by two-stage lookup tables in caches, the efficiency of the cache memory may be enhanced. For the sake of description convenience, in example embodiments, a data size of the graphics state setting value may be about 16 bytes and that of the handle value may be about 32 bits (about 4 bytes).

When the same graphics state setting value is used for sets of eight draw calls, a GPU (e.g., GPU 10) may store only eight graphics state setting values for processing a total of 64 draw calls.

When only a first stage lookup table is used in the cache (e.g., cache 12), that is, when an identifier of a draw call is directly mapped to the graphic state setting value without using the handle value, a total memory of about 64*16 bytes or about 1,024 bytes is used.

However, when two-stage lookup tables are used in the cache, that is, when the handle value is mapped to the identifier of the draw call in a first lookup table and the graphics state setting value is mapped to the handle value in a second lookup table, a memory of about 64*4 bytes or about 256 bytes may be used in the first lookup table and a memory of about 8*16 bytes or about 128 bytes may be used in the second lookup table. Thus, a total memory of about 384 bytes may be used.

In other words, when the two-stage lookup tables are used in the cache, the same graphics state setting value may not be stored in duplicate in the cache and thus, the efficiency of the cache memory may be enhanced. In particular, by not storing duplicate graphics state setting values, the cache has more space for draw call identifiers. By increasing the number of draw call identifiers stored by the cache, the frequency by which the GPU experiences a cache miss is reduced. Thus, the two-stage lookup tables increase the efficiency of the GPU by permitting the GPU to operate using the higher speed cache, as opposed to the lower speed memory, more often than it would using only a first stage lookup table.

Figure 10:
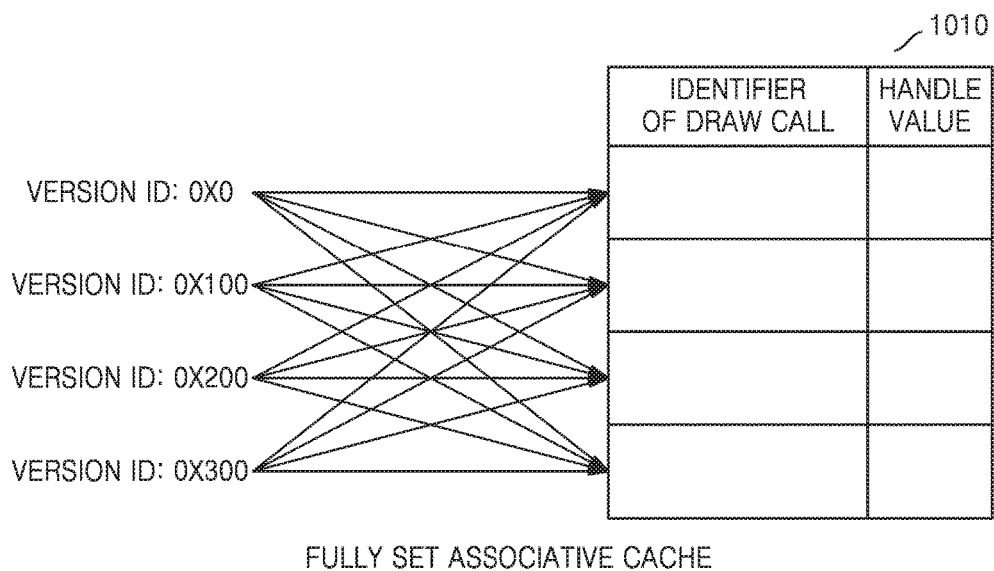
FIGS. 10 and 11 are diagrams illustrating methods used by a GPU to search a cache according to example embodiments.
Figure 11:
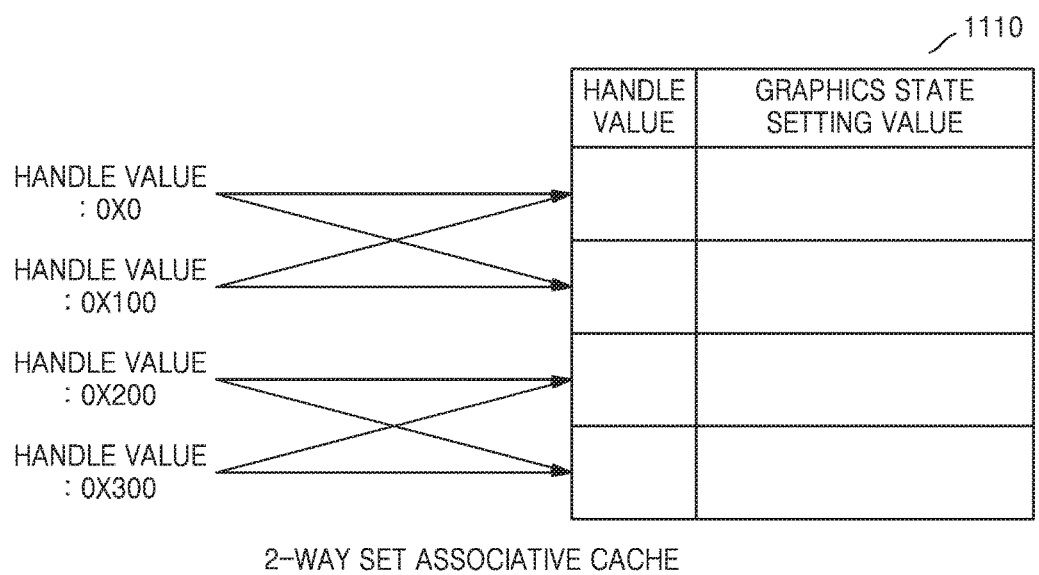

FIGS. 10 and 11 are diagrams illustrating methods used by a GPU to search a cache according to example embodiments.

Referring to FIG. 10, a GPU (e.g., GPU 10) may determine whether an identifier of a received draw call is included in a first lookup table 1010 by using the fully set associative methods. In the fully set associative methods, the identifier of the draw call may be stored at any entry in the first lookup table 1010. Accordingly, the GPU may search all entries in the first lookup table 1010 and determine whether an identifier of a newly received draw call is included in the first lookup table 1010. In example embodiments, when four entries are included in the first lookup table 1010, the identifier of the newly received draw call may be stored at any entry among the four entries in the first lookup table 1010. Thus, when a draw call is newly received, the GPU may search all four entries in the first lookup table 1010 and determine whether the identifier of the newly received draw call is included in the first lookup table 1010.

The occurrence of cache conflicts may be reduced by using the fully set associative methods and thus, performance of the GPU may be enhanced. In addition, since the identifier of the draw call included in the first lookup table 1010 has the data size of only about 10 bits, an overhead may be small even when all entries in the first lookup table 1010 are searched by using the fully set associative methods.

Referring to FIG. 11, a GPU (e.g., GPU 10) may determine whether a handle value mapped to an identifier of a received draw call is included in a second lookup table 1110 by using the n-way set associative methods. In the n-way set associative methods, the handle values may be stored only in n-way, that is, only at n entries in the second lookup table 1110. Depending on set indices of the handle values, n entries may be determined at which the handle values are to be stored. Thus, the GPU may determine whether the handle value is included in the second lookup table 1110 by searching only n entries among M (M>n) entries in the second lookup table 1110. In example embodiments, in the two-way set associative methods, when four entries are included in the second lookup table 1110, a newly obtained handle value may be stored at two entries, which are determined by the set index of the handle value, among four entries in the second lookup table 1110. Accordingly, the GPU may determine whether the newly obtained handle value is included in the second lookup table 1110 by searching only two entries among four entries in the second lookup table 1110.

The overhead may be further reduced by using the n-way set associative methods. In addition, when the handle value is included in the second lookup table 1110, the number of the handle values in duplicate may be large while the data size of the handle values is greater than that of the identifier of the draw call. Accordingly, a relatively high frequency of cash hits may occur and thus, the n-way set associative methods may be more efficient.

Example embodiments of the present disclosure may be similarly applied to eliminate duplicate data in systems using data that is indirectly referenced by an index such as with the graphics state setting value.

The device described herein may include a processor for executing program data, a memory for storing program data, a permanent storage unit such as a disk drive, a communications port for handling communications with external devices, and user interface devices, including a touch panel, keys, buttons, etc. When software modules or algorithms are involved, these software modules may be stored as program instructions or computer-readable codes executable on a processor on a non-transitory computer-readable recording medium. Example embodiments of the non-transitory computer-readable recording medium include magnetic storage media (e.g., ROM, RAM, floppy disks, hard disks, etc.), and optical recording media (e.g., CD-ROMs, digital versatile disks (DVDs), etc.). The non-transitory computer-readable recording medium may also be distributed over network coupled computer systems so that the computer-readable code is stored and executed in a distributive manner. This non-transitory media may be read by the computer, stored in the memory, and executed by the processor.

The example embodiments may be described in terms of functional block components and various processing operations. Such functional blocks may be realized by any number of hardware and/or software components configured to perform the specified functions. Example embodiments may involve the implementation of various integrated circuit (IC) components, e.g., memory elements, processing elements, logic elements, look-up tables, and the like, which may carry out a variety of functions under the control of one or more microprocessors or other control devices. Similarly, where the elements of the example embodiments are implemented using software programming or software elements, the example embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the example embodiments may employ any number of conventional techniques for electronics configuration, signal processing and/or control, data processing and the like. The words "mechanism," "element," "means," and "configuration" are used broadly and are not limited to mechanical or physical example embodiments, but may include software routines in conjunction with processors, etc.

The particular implementations shown and described herein are example embodiments and are not intended to otherwise limit the scope of example embodiments in any way. For the sake of brevity, conventional electronics, control systems, software development and other functional aspects of the systems may not be described in detail. Furthermore, the connecting lines, or connectors shown in the various figures presented are intended to represent example embodiments of functional relationships and/or physical or logical couplings between the various elements. It should be noted that many alternative or additional functional relationships, physical connections or logical connections may be present in a practical device.

The use of the terms "a" and "an" and "the" and similar referents in the context of describing the example embodiments (and especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein may be performed in any suitable order unless otherwise indicated herein or otherwise clearly contradicted by context. The example embodiments are not limited to the described order of the operations. The use of any and all example embodiments, or representative language (e.g., "such as") provided herein, is intended merely to better illuminate the example embodiments and does not pose a limitation on the scope of the example embodiments unless otherwise claimed. Numerous modifications and adaptations will be readily apparent to one of ordinary skill in the art without departing from the spirit and scope of the example embodiments.

It should be understood that example embodiments described herein should be considered in a descriptive sense only and not for purposes of limitation. Descriptions of features or aspects within example embodiments should typically be considered as available for other similar features or aspects in example embodiments.

While example embodiments have been described with reference to the figures, it will be understood by those of ordinary skill in the art that various changes in form and details may be made therein without departing from the spirit and scope as defined by the following claims.

What is claimed is:

1. A method of managing graphics data in a graphics processing device, the method comprising:
   generating a first lookup table storing a first identifier of a first draw call in association with a first handle value;
   generating a second lookup table storing a first graphics state setting value in association with the first handle value, the first graphics state setting value corresponding to the first identifier, the first handle value representing a storage location at which the first graphics state setting value is stored, the storage location being external to the second lookup table; and
   performing at least one graphics pipeline operation to process the first draw call by using the first graphics state setting value obtained from the second lookup table
   wherein the method further comprises:
   determining whether a second identifier of a second draw call is stored in the first lookup table;
   determining whether a second handle value, stored in association with the second identifier in the first lookup table, is stored in the second lookup table; and
   performing at least one graphics pipeline operation to process the second draw call by using a second graphics state setting value, stored in association with the second handle value in the second lookup table, in response to determining the second handle value is stored in the second lookup table,
   wherein the determining whether the second handle value is stored in the second lookup table includes obtaining the first handle value stored in association with the second identifier in the first lookup table in response to determining that the second identifier is stored in the first lookup table, the first handle value being stored in association with the second identifier in the first lookup table based on the second handle value being the same as the first handle value.

2. The method of claim 1, wherein the generating the first lookup table includes storing a second handle value in association with the first identifier as the first handle value when the second handle value, stored in the first lookup table in association with a second identifier of a second draw call received prior to the first draw call, is the same as the first handle value.

3. The method of claim 1, wherein the first handle value is different from at least one other handle value stored in the second lookup table.

4. The method of claim 1, further comprising:
   storing the second identifier in association with the second handle value in the first lookup table in response to determining that the second identifier is not stored in the first lookup table,
   wherein the determining whether the second handle value is stored in the second lookup table includes obtaining the second handle value from the first lookup table.

5. The method of claim 1, wherein the performing the at least one graphics pipeline operation to process the second draw call includes obtaining the second graphics state setting value stored in association with the second handle value from the second lookup table in response to determining that the second handle value is stored in the second lookup table.

6. The method of claim 1, further comprising:
  storing the second graphics state setting value in association with the second handle value in response to determining that the second handle value is not stored in the second lookup table, the second graphics state setting value corresponding to the second identifier,
  wherein the performing the at least one graphics pipeline operation to process the second draw call includes obtaining the second graphics state setting value from the second lookup table.

7. The method of claim 1, wherein,
  the generating the first lookup table generates the first lookup table in a cache,
  the generating the second lookup table generates the second lookup table in the cache, and
  the storage location is a memory address of a memory external to the cache.

8. A graphics processing apparatus for managing graphics data, the graphics processing apparatus comprising:
  a cache configured to store a first lookup table and a second lookup table; and
  at least one processor configured to:
    generate the first lookup table storing a first identifier of a first draw call in association with a first handle value;
    generate the second lookup table storing a first graphics state setting value in association with the first handle value, the first graphics state setting value corresponding to the first identifier, the first handle value representing a storage location at which the first graphics state setting value is stored, the storage location being external to the second lookup table; and
    perform at least one graphics pipeline operation to process the first draw call by obtaining the first graphics state setting value from the second lookup table
  wherein the at least one processor is further configured to:
    determine whether a second identifier of a second draw call is stored in the first lookup table;
    determine whether a second handle value, stored in association with the second identifier in the first lookup table, is stored in the second lookup table; and
    perform at least one graphics pipeline operation to process the second draw call by using a second graphics state setting value, stored in association with the second handle value in the second lookup table, in response to determining the second handle value is stored in the second lookup table,
  wherein the determination of whether the second handle value is stored in the second lookup table includes obtaining the first handle value stored in association with the second identifier in the first lookup table in response to determining that the second identifier is stored in the first lookup table, the first handle value being stored in association with the second identifier in the first lookup table based on the second handle value being same as the first handle value.

9. The apparatus of claim 8, wherein the generation of the first lookup table includes storing a second handle value in association with the first identifier as the first handle value when the second handle value, stored in the first lookup table in association with a second identifier of a second draw call received prior to the first draw call, is the same as the first handle value.

10. The apparatus of claim 9, wherein the first handle value is different from at least one other handle value stored in the second lookup table.

11. The apparatus of claim 8, wherein the at least one processor is further configured to:
  store the second identifier in association with the second handle value in the first lookup table in response to determining that the second identifier is not stored in the first lookup table,
  wherein the determination of whether the second handle value is stored in the second lookup table includes obtaining the second handle value from the first lookup table.

12. The apparatus of claim 8, wherein,
  the performance of the at least one graphics pipeline operation to process the second draw call includes obtaining the second graphics state setting value stored in association with the second handle value from the second lookup table in response to determining that the second handle value is stored in the second lookup table, and
  the at least one processor is further configured to,
    store the second graphics state setting value in association with the second handle value in response to determining that the second handle value is not stored in the second lookup table, and
    perform the at least one graphics pipeline operation to process the second draw call by obtaining the second graphics state setting value from the second lookup table.

* * * * *